June 4, 1968   L. B. ADES   3,386,588
COOLANT FILTER
Filed Oct. 14, 1966
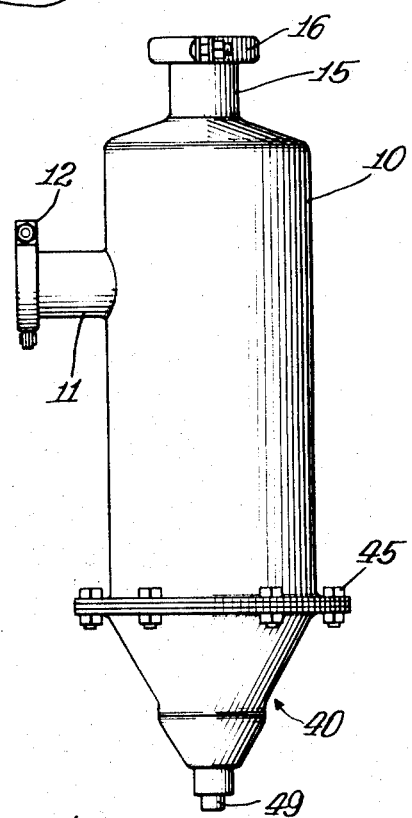
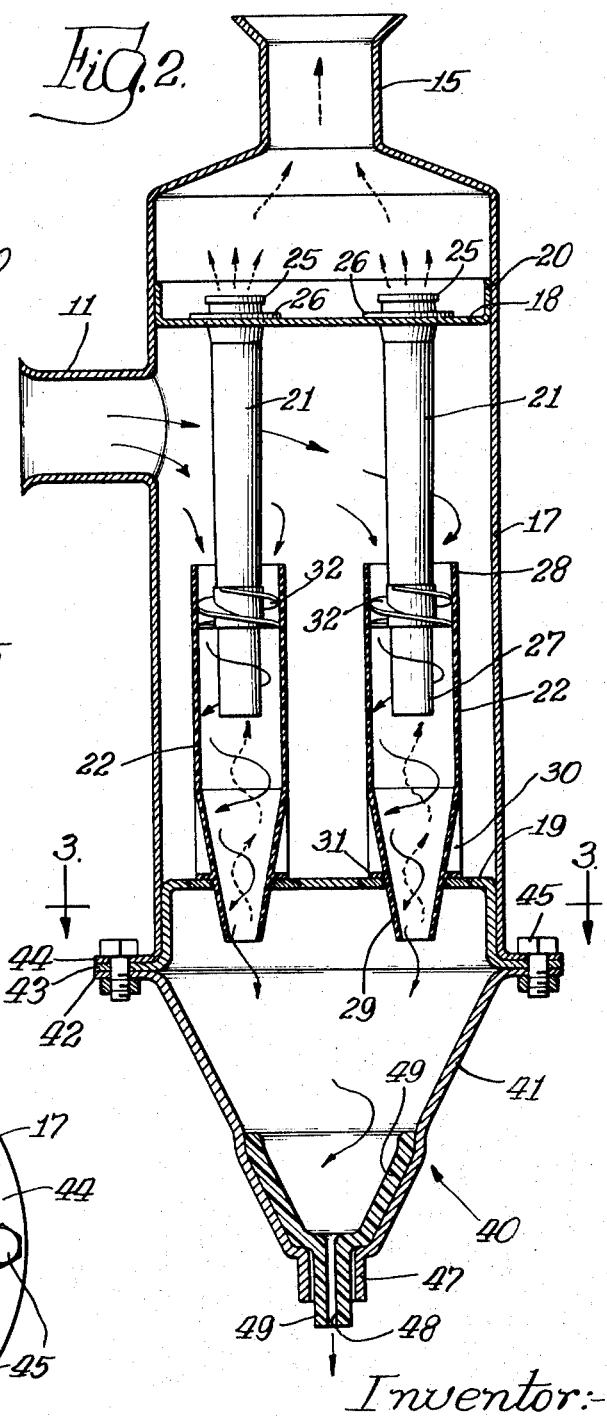
Inventor:-
Lewis B. Ades,
By Hofgren, Wegner, Allen,
Stellman & McCord Attys.

United States Patent Office 3,386,588
Patented June 4, 1968

3,386,588
COOLANT FILTER
Lewis B. Ades, Rockford, Ill., assignor to Sundstrand Corporation, a corporation of Illinois
Filed Oct. 14, 1966, Ser. No. 586,750
1 Claim. (Cl. 210—512)

ABSTRACT OF THE DISCLOSURE

A coolant filter in which a plurality of centrifugal action separator units are mounted in a casing which has an inlet for coolant, a first outlet for clean coolant, and a second outlet for contaminated coolant. A generally conically shaped member is disposed at the second outlet with the large diameter end thereof adjacent the separator units to receive contaminants from all of the units and create a back pressure within the member. The small diameter end of the member has a small opening which provides a restricted passage from which the contaminants and a small amount of coolant are free to continuously discharge without destroying the back pressure of coolant within said member.

Background and summary of the invention

It is known in the art of coolant filters to have units utilizing centrifugal separator units or tubes in which contaminant contained by the coolant is centrifuged through vortex action and with the contaminants leaving the separator units and passing to a container connected to the filter and which must periodically be removed for cleaning after shutting down of the filter unit.

An object of this invention is to provide a coolant filter which can act continuously and which provides for the use of coolant underflow for automatically removing contaminants from the filter, with only a small amount of coolant underflow being required to remove the contaminants from the filter.

Still another object of the invention is to provide a liquid coolant filter in which a casing mounts a plurality of centrifugal separator units for centrifuging contaminants from the flow of coolant and with a generally conical-shaped member at one end of the casing providing for collection of the contaminants and some coolant as discharged from the separator tubes which has a restricted outlet to permit continuous underflow from the filter with removal of the concentrated contaminant solids and while still maintaining sufficient back pressure within the filter to cause satisfactory operation of the centrifugal separator units.

Still another object of the invention is to provide a liquid coolant filter as defined in the preceding paragraph wherein the generally conical-shaped member has its larger diameter end adjacent the outlets of the centrifugal separator tubes so as to collect contaminants from all of said tube units and with the opposite end of said member having the restricted outlet for underflow and with a wear member positioned within the generally conical member for take-up of the wear resulting from the contaminant flow and being easily replaceable to prolong the life of the coolant filter.

Further objects and advantages will become apparent from the following detailed description taken in connection with the accompanying drawings in which:

FIG. 1 is an elevational view of the coolant filter;

FIG. 2 is a central vertical section, on an enlarged scale, of the coolant filter; and FIG. 3 is a section, taken generally along the line 3—3 in FIG. 2.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The casing 10 of the coolant filter has an inlet port 11 extending from a side thereof provided with a coupling member 12 for receiving coolant having contaminants carried therein. One use of the filter is with coolant from machine tools such as grinders. The filter separates the solid contaminants from the coolant, with the overflow or clean coolant leaving the casing through a port 15 at the top of the casing and which has a coupling member 16 associated therewith. The casing is generally cylindrical, with a wall 17 from which the inlet port 11 extends. A pair of transverse partitions 18 and 19 are positioned in spaced-apart relation within the casing 10, with the first partition 18 having a flange 20 which can be secured, as by welding, to the wall 17 of the casing. The inlet port communicates with the interior of the casing between the partitions 18 and 19, while the outlet port 15 is at the opposite side of the first partition 18.

The partitions 18 and 19 mount a plurality of centrifugal separator tubes or units, each of which are of the same construction and each of which embody an inner tube 21 and an outer tube 22 having an annular space therebetween along their overlapping lengths. Technically, the contaminants are removed by a separating action so that the unit described could be referred to as a "separator," instead of as a "filter" as used herein, although the latter name is commonly used. The inner tube 21 has an end 25 positioned to one side of the partition 18, with a flange 26 engageable against the partition and an opposite end 27 positioned within the outer tube 22. A first end 28 of the outer tube surrounds the inner tube 21 and is located in the hollow casing in the space between the partitions 18 and 19 to receive contaminated coolant entering through inlet port 11. The opposite end 29 of the outer tube converges, as shown in FIG. 2, and extends through the beyond the partition 19 into a collecting chamber for contaminants. The separator units are suitably formed of plastic (or metals), with the outer tube having strengthening ribs 30 terminating in a continuous flange 31 which rests against the top of the lower partition 19. A helical vane 32 is mounted on a reduced portion of the inner tube 21 and positioned within the outer tube 22 to induce a vortex in the rapidly flowing coolant, as the coolant flows downwardly in the outer tube 22, whereby contaminant particles are centrifuged out against the inner wall of the outer tube 22 and with the assistance of gravity caused to move down along the inner wall of the outer tube 22 and through the converging end of the outer tube into a collecting chamber. This flow of coolant is shown by the arrows in solid line in FIG. 2. Clean coolant is reversed at the bottom of the converging end of the outer tube 22 and returns in an inner vortex through the inner tube 21 to travel past the partition 18 and flow out the overflow outlet 15. This latter flow path is shown by broken line arrows in FIG. 2.

The foregoing structure is known in the art. I have provided with this known structure means for rendering the coolant filter fully automatic in use, with a continuous underflow of a small amount of coolant from the filter carrying with it the concentrated contaminant solids, with the structure providing for a back pressure within the filter which is required to have the separator tubes operate properly by causing reversal of the clean coolant to travel along the inner tube 21.

This structure embodies a hollow, generally-conical adapter member, indicated generally at 40, having a wall 41 which, at its large diameter end, has an outwardly-turned flange 42 which matches an outwardly-turned flange 43 of the partition plate 19 and an outwardly-turned flange 44 of the casing wall 17. These three components are held in assembled relation by a series of threaded connections, such as the nut and bolt structure 45, shown in the drawings. The conical adapter member 40, at its large diameter end, is of a size to span the outlets of all the separator units to collect the contaminants and some coolant flowing out of the separator units and has a restricted outlet end for continuous underflow from the filter, with this limited flow resulting in sufficient back pressure within the collecting chamber defined by the adapter member. The conical member 40 has an outlet end 47 and the outlet opening is provided by a passage 48 in a wear member 49 of plastic (or metal) which is made of a shape to matingly engage the interior surface of the coned adapter and which is replaceable so that wear caused by the flow of contaminants will be taken up by the wear member and the member can be replaced when desired or necessary.

With the structure as described herein, a small continuous amount of underflow from the filter carries off the solid contaminants as distinct from prior constructions, as known in the art, wherein a collecting device, such as a bottle, is placed at the lower end of the filter. With the restricted outlet, as provided by a sufficiently small opening of the outlet 48, the underflow can be continuous without taking a substantial amount of coolant from the system and, further, the underflow can be continuous while still not destroying the back pressure required within the filter to insure operation of the separator units.

As an example, in a unit handling 30 gallons per minute, there can be two separator tubes (or 150 gallons per minute there can be ten separator tubes) and the conical member 40 has an outlet opening diameter of from $1/16''$ to $1/4''$.

I claim:
1. A coolant filter having a casing, a plurality of centrifugal action separator units mounted in said casing and each unit having an opening for the discharge of contaminants, an inlet to said casing for coolant, an outlet from said casing for clean coolant, an outlet from said casing for contaminated coolant, an inlet in each of said separator units in communication with said casing inlet, a clean coolant outlet in each of said separator units in communication with said casing clean coolant outlet, said separator unit contaminant discharge openings being in communication with said casing outlet for contaminated coolant, a generally conically-shaped hollow member in sealing relation with the walls of said casing adjacent said latter outlet, the large diameter end of said member extending upwardly to adjacent the separator units to receive contaminants from all of said units and the small diameter end of said member having passageway means providing communication, via the outlet from said casing for contaminated coolant, between the interior and exterior of said casing, the cross-section of said passageway means being substantially less than any of the contaminant discharge openings of the separator units, thereby providing a restricted passage from which the contaminants and a small amount of coolant are free to continuously discharge without destroying the back pressure of coolant within said casing.

References Cited
UNITED STATES PATENTS

| | | | |
|---|---|---|---|
| 2,378,632 | 6/1945 | Hooker et al. | 210—512 |
| 2,954,871 | 10/1960 | Lummus et al. | 209—211 |
| 3,057,476 | 10/1962 | Gilbert | 209—211 |
| 3,261,467 | 7/1966 | Wikdahl | 209—211 |

REUBEN FRIEDMAN, *Primary Examiner.*

J. L. DE CESARE, *Assistant Examiner.*

UNITED STATES PATENT OFFICE
CERTIFICATE OF CORRECTION

Patent No. 3,386,588 June 4, 1968

Lewis B. Ades

It is certified that error appears in the above identified patent and that said Letters Patent are hereby corrected as shown below:

In the heading to the printed specification, line 4, "Illinois" should read -- Delaware --.

Signed and sealed this 10th day of March 1970.

(SEAL)
Attest:

Edward M. Fletcher, Jr.  
Attesting Officer

WILLIAM E. SCHUYLER, JR.  
Commissioner of Patents